(12) United States Patent
Genesseaux

(10) Patent No.: US 11,486,540 B2
(45) Date of Patent: Nov. 1, 2022

(54) VACUUM LUBRICATION DEVICE FOR FLYWHEEL

(71) Applicant: ENERGIESTRO, Châteaudun (FR)

(72) Inventor: Andre Genesseaux, Conie-Molitard (FR)

(73) Assignee: ENERGIESTRO, Châteaudun (FR)

( * ) Notice: Subject to any disclaimer, the term of this patent is extended or adjusted under 35 U.S.C. 154(b) by 807 days.

(21) Appl. No.: 16/348,660

(22) PCT Filed: Oct. 11, 2017

(86) PCT No.: PCT/FR2017/052794
§ 371 (c)(1),
(2) Date: May 9, 2019

(87) PCT Pub. No.: WO2018/091789
PCT Pub. Date: May 24, 2018

(65) Prior Publication Data
US 2019/0264868 A1    Aug. 29, 2019

(30) Foreign Application Priority Data

Nov. 16, 2016 (FR) ...................................... 1661089

(51) Int. Cl.
*F16N 7/02* (2006.01)
*F03G 3/08* (2006.01)
(Continued)

(52) U.S. Cl.
CPC ................ *F16N 7/02* (2013.01); *F16F 15/30* (2013.01); *F16F 15/3156* (2013.01);
(Continued)

(58) Field of Classification Search
CPC ............. F16N 7/02; F16N 31/00; F16D 57/02
See application file for complete search history.

(56) References Cited

U.S. PATENT DOCUMENTS 3,350,135 A    10/1967  Martens
5,524,728 A *  6/1996  Williams ............ F16C 33/1085
                                                    184/29
(Continued)

FOREIGN PATENT DOCUMENTS

FR    1402430 A    6/1965
JP    S61-99737 A  5/1986
(Continued)

OTHER PUBLICATIONS

International Search Report, dated Jan. 18, 2018, from corresponding PCT application No. PCT/FR2017/052794.

*Primary Examiner* — Michael R Mansen
*Assistant Examiner* — Mark K Buse
(74) *Attorney, Agent, or Firm* — Nixon & Vanderhye

(57) ABSTRACT

Disclosed is a device for lubrication of a unit turning under vacuum, such as a flywheel, where the unit includes an axle rotating relative to a fixed bearing structure, via at least one bearing or roller, and where the unit is placed in an enclosure connected to a vacuum, with: a lubricant reservoir connected by pipes both to the bottom of the enclosure and also to the bearing; and fluid suitable circulator for connecting the reservoir either to the vacuum, for filling the reservoir from the enclosure by gravity, or to the atmosphere for lubricating the bearing. The fluid circulator includes a three-way valve connecting the reservoir either to the vacuum or to the atmosphere.

14 Claims, 3 Drawing Sheets

(51) Int. Cl.
    *F16F 15/315* (2006.01)
    *F16F 15/30* (2006.01)
    *F16N 29/02* (2006.01)
    *F01M 11/04* (2006.01)

(52) U.S. Cl.
    CPC .......... *F16N 29/02* (2013.01); *F01M 11/045* (2013.01); *F03G 3/08* (2013.01); *F16F 2230/04* (2013.01)

(56) References Cited

U.S. PATENT DOCUMENTS

| | | | | |
|---|---|---|---|---|
| 5,862,841 | A | * | 1/1999 | Wuester, Sr. ......... F16C 33/106 141/82 |
| 2005/0173196 | A1 | * | 8/2005 | Yoneyama ............ F16C 33/103 184/15.2 |
| 2020/0403479 | A1 | * | 12/2020 | Bergan ................ F16C 32/0696 |

FOREIGN PATENT DOCUMENTS

| JP | S61-99738 A | 5/1986 |
|---|---|---|
| JP | S62-178777 A | 8/1987 |
| JP | 2003-097792 A | 4/2003 |

\* cited by examiner

VACUUM LUBRICATION DEVICE FOR FLYWHEEL

BACKGROUND OF THE INVENTION

Field of the Invention

The invention relates to a lubrication device for a turning unit, such as a flywheel, intended to store kinetic energy, placed inside a vacuum enclosure.

The invention relates to any type of flywheel, and particularly to a flywheel made based on preformed concrete having a high compression resistance, as for example described by the French patent application 14/02430, in the applicant's name.

Description of the Related Art

As is known, flywheels comprise a turning axle, usually vertical, around which a heavy and strong mass is attached.

The axle rests on a structure attached by bearings.

The axle is connected to an electric motor which drives it in rotation. After stopping the supply to the electric motor, the mass of the flywheel, having stored the kinetic energy, continues to turn and can then restore the mechanical energy, which is in turn converted back to electrical energy by using the motor as an electric generator.

The rotation of the mass about itself creates kinetic energy which can thus be stored temporarily, in order for various uses, such as for storing intermittent renewable energy of wind or solar type, supplying electricity to isolated sites, or restoring energy for braking of vehicles, etc.

Compared to electric energy storage devices such as rechargeable electric batteries, flywheels have a nearly unlimited life, reducing storage cost.

Flywheels are placed in vacuum enclosures in order to reduce mechanical energy losses due to friction. The bearings/rollers must be lubricated to have an unlimited life.

However, vacuum lubrication has difficulties, whatever lubricant is used.

If the lubricant is grease, the vacuum leads to evaporation which quickly reduces the lubricating power thereof. If more grease is added to the roller, the excess grease causes friction which dissipates the energy stored in the flywheel. To avoid that, the rollers and the grease thereof are changed after a few years, with the resulting financial consequences that become even greater for large-size flywheels.

It is difficult to circulate oil under vacuum, since the pumps do not operate in vacuum because they were designed to operate with a strictly positive absolute pressure. When a pump aspirates, it in fact creates a low pressure (pressure lower than the absolute pressure) and it is the higher external pressure which pushes the fluid into the pump. In the vacuum, the absolute pressure is zero, it is therefore not possible to create a low pressure, and a pump cannot aspirate.

Increasing the absolute pressure by submerging the pump in a sufficient height of oil was proposed. However, this considerably increases the vertical dimension of the flywheel. Further, since the pump would necessarily have to be placed at the lowest point, maintenance thereof would be difficult since flywheels are generally accessible from the top. As is known, replacing the rollers with magnetic bearings was proposed, but the prohibitive cost thereof strongly limits interest in this option.

Thus, the prior art does not provide a solution with which to satisfy the contradictory constraints that, in the case of the flywheel placed under vacuum, are:
Low cost of structure;
Bearings that are simple and not burdensome;
Small dimension, especially under the flywheel;
Pump not located in the lower part of the flywheel.

SUMMARY OF THE INVENTION

The invention remedies this situation.

For this purpose, according to the invention, the device for lubrication of a unit turning under vacuum, such as a flywheel, where said unit comprises an axle rotating relative to a fixed bearing structure, via at least one bearing or roller, and where said unit is placed in an enclosure connected to means for drawing a vacuum, is characterized in that it comprises:
A lubricant reservoir connected by pipes both to the bottom of the enclosure and also to the bearing;
and a means for circulation of the fluid suitable for connecting the reservoir either to the means for drawing a vacuum, for filling the reservoir from the enclosure by gravity, or to the atmosphere for lubricating the bearing.

Thus, in a normal situation the reservoir is connected to the vacuum and therefore fills with lubricating fluid by gravity. To release the lubricant, the reservoir is connected to atmospheric pressure causing the fluid to rise back towards the top of the enclosure.

Advantageously, the means of fluid circulation comprises a three-way valve connecting the reservoir either to means for drawing a vacuum or to the atmosphere.

Preferably, a two-way, normally-open valve is provided disposed between the reservoir and the enclosure, and, according to an advantageous form, controlled by a piston cylinder where one chamber is connected to the reservoir and the other chamber to the enclosure and the piston controls said valve.

Further, the device comprises a flow rate sensor arranged between the reservoir and the bearing, and a filter upstream from the sensor.

The reservoir is placed at the same level as, or lower than, the lower part of the enclosure.

The device comprises a normally-open, anti-backflow valve between the reservoir and the enclosure.

A three-way solenoid valve is additionally provided whose two outlets are each connected to a roller/bearing.

The invention also relates to a flywheel comprising a massive body of a main material, such as concrete, arranged on or combined with an axle turning relative to a fixed bearing structure, by at least one bearing or roller, said flywheel being placed in an enclosure, receiving the flywheel and the bearing, and connected to means for drawing vacuum, characterized in that it comprises a lubrication device as presently described.

Finally, the invention also relates to a method for lubricating a flywheel comprising a body of a material, such as concrete, rotatable about itself on a fixed vertical axle bearing on at least one roller/bearing and comprising lubrication means, method in which:
The flywheel is placed in a sealed enclosure;
A means for drawing vacuum (such as a vacuum pump) is provided and connected to the enclosure;
A lubricant reservoir is provided;
The lubricant reservoir at the bottom of the closure and the bearing are connected to each other by pipes;

The reservoir is connected either to the vacuum, to fill it by gravity from the enclosure, or to atmosphere to lubricate the bearing.

In the remainder the description, the terms "inside", "outside", "lower", "upper", "upstream", and "downstream" are understood as describing the given parts or elements in the context of a normal installation of the flywheel.

BRIEF DESCRIPTION OF THE DRAWINGS

The present invention is now described using examples that are solely illustrative and no way limiting on the scope of the invention, and based on the attached illustrations, in which.

DESCRIPTION OF THE PREFERRED EMBODIMENTS

Figure 1:
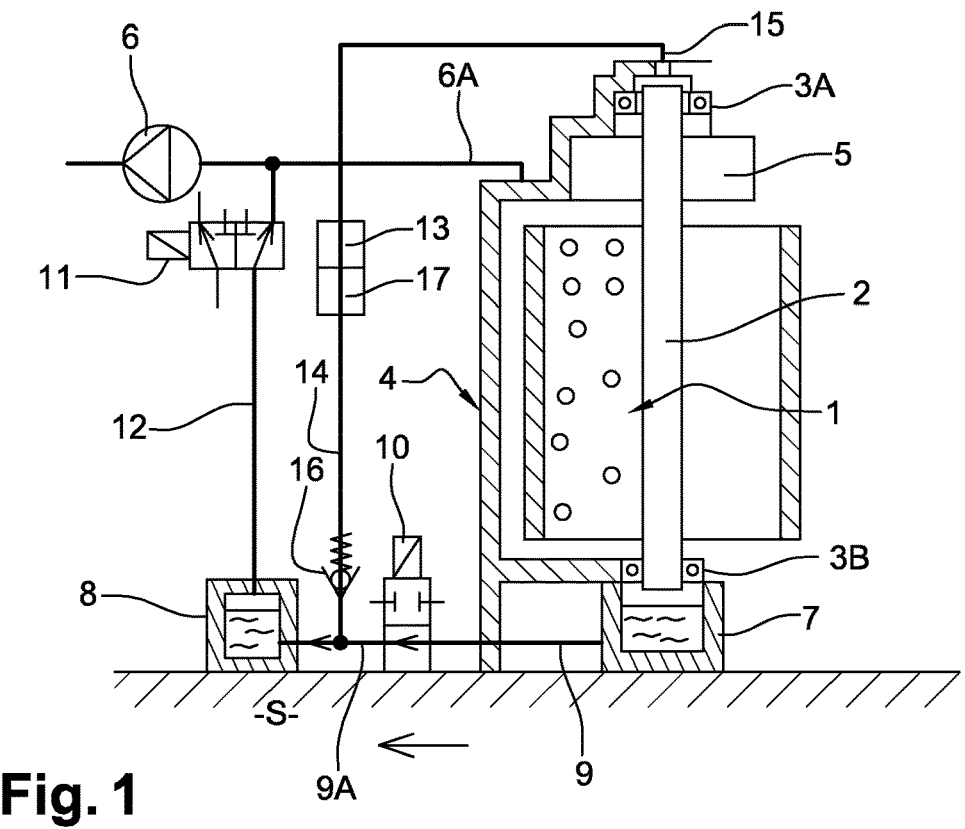
FIG. 1 shows an axial section view of one half of the flywheel and all of the lubrication system from the invention.
Figure 2:
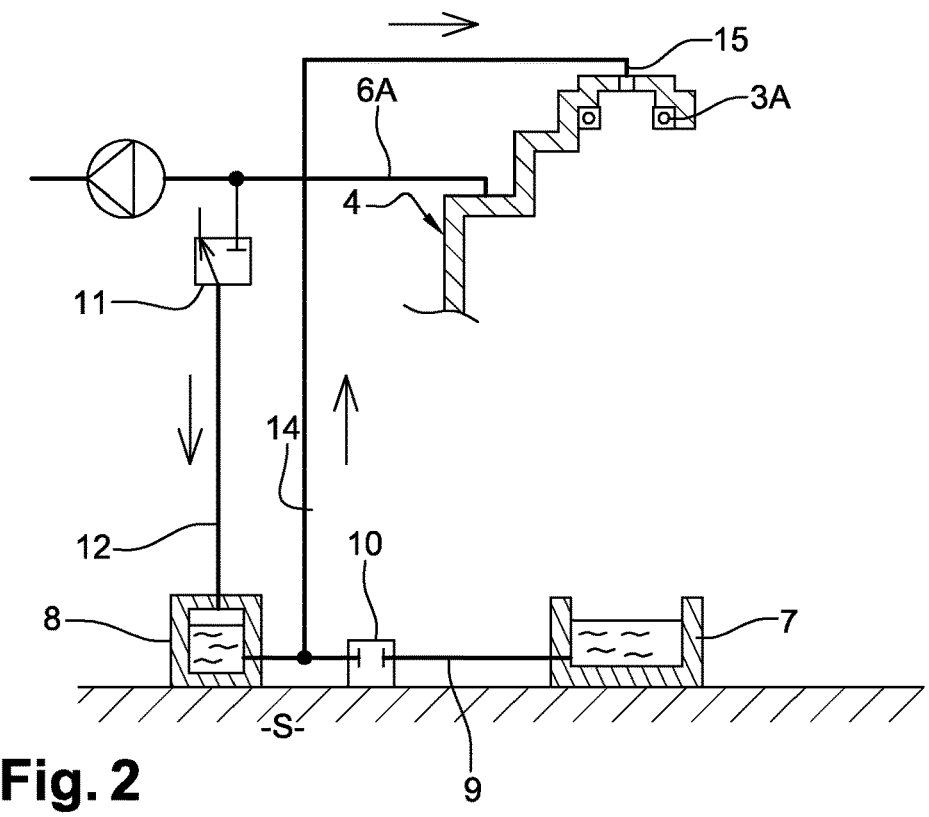
FIG. 2 is a sketch of the lubricant circulation circuit in operation in which the flywheel is partially shown.

With reference to FIG. 1, the flywheel 1 from the invention, provided with a lubrication system, is cylindrical in shape, extended along a vertical axis and centered on a vertical rotating axle 2 turning on itself and mounted on two fixed bearings, upper 3A and lower 3B.

Thus, the flywheel 1 turns about itself (likewise rotates/spins) relative to the fixed bearings 3A and 3B.

The flywheel is arranged in a sealed enclosure 4 with a complementary shape leaving space around the flywheel. The bearings are located and fixed in respectively high and low parts of the enclosure 4.

A motor/alternator 5 combined with the top part of the enclosure 4, under the upper bearing 3A can accelerate and slow the flywheel, for increasing or decreasing the kinetic energy thereof.

The lubrication system is provided and described below.

Said system comprises a means for drawing a vacuum, such as a vacuum pump 6, connected by a pipe 6A, to the enclosure 4, to make a vacuum therein, between $1/100$ and $1/1000$ atm for example.

The fluid lubricant is injected in the top part of the enclosure, above the upper bearing 3A, in a way described later.

A receptacle 7 is provided and is part of the base supporting the lower bearing 3B and the enclosure, in the bottom of the enclosure 4. The receptacle 7 collects the lubricant flowing by gravity in the enclosure.

The receptacle 7 and the enclosure rest on the ground S.

The lubrication system from the invention further comprises:
- a sealed reservoir (or reserve) 8 of lubricant, in the lower part, resting on the ground S, near the receptacle 7 (or at a level lower than it);
- the reservoir 8 is connected thereto by a lower pipe 9;
- a two-way valve 10 arranged on the lower pipe 9;
- a three-way valve 11 arranged on a pipe 12 connecting the reservoir 8 either to vacuum (via the pipe 6A), or to the atmosphere;
- a sensor 13, in the form of a flow-rate meter, placed on a pipe 14 connecting both the upstream part 9A of the pipe 9 (between the two-way valve 10 and the reservoir 8) and also the supply inlet 15 of the enclosure 4 on the top part thereof, above the upper bearing 3A;
- an anti-backflow valve 16 arranged on the pipe 14, between the part 9A of the pipe 9 and the flow-rate meter 13;
- a filter 17 placed upstream of the flow-rate meter 13 on the pipe 14.

The valve 10 is of the two-way, normally-open type. In other words, without any command, it allows the passage of lubricant in the pipe 9, from the receptacle 7 to the reservoir 8.

The valve 11 is of the three-way type, and it connects, without any command, the reservoir 8 with the enclosure 4 which is under vacuum.

In general, the reservoir 8, without any command to the valve 11, is connected with vacuum, meaning with any means able to create a vacuum (means for drawing vacuum), or any environment dominated by a vacuum (such as the enclosure 4). In an embodiment (not shown) including a series of several flywheels, associated with a single means for drawing vacuum, the reservoir 8 associated with each flywheel, is then suitable for being connected to the shared means for drawing vacuum or to the enclosure of the neighboring flywheel, or to the enclosure of the flywheel with which said reservoir is associated.

When the valve 11 is actuated, it connects the reservoir 8 to ambient air (atmosphere).

The reservoir 8, pipe 9 and the valve 10 are placed as low as possible, near the ground S, without high point, and at the same level as, or below, the low part of the enclosure. This is done so that the lubricant from the receptacle 7 of the enclosure 4 fills the reservoir 8 solely under the effect of gravity, according to the principle of communicating vessels.

Without any command/control to the valves 10 and 11, the pressure above the liquid is the same in the enclosure 4 and in the reservoir 8, because of the valve 11. In normal situation, the reservoir 8 is therefore filled with some quantity of lubricant.

When the valves 10 and 11 are commanded/controlled, the valve 11 connects the reservoir 8 to the atmosphere, the valve 10 closes the pipe 9 and the atmospheric pressure pushes the lubricant from the reservoir 8 to the inlet point 15 into the enclosure, just above the upper bearing.

The valves 10 and 11 are commanded at regular intervals, for example of a few hours, for a few seconds, to provide an optimal lubrication of the bearings 3A and 3B. These intervals and times are determined by successive tests, and then applied by a programmable logic controller or a time-delay module.

The lubrication system from the invention therefore serves to lubricate the rollers very reliably, very simply and very economically because a valve costs much less than a pump and is much more reliable.

Below, implementation variants of the invention are described.

With reference to FIG. 1, the flywheel comprises an anti-backflow valve 16 on the pipe 14 in order to prevent the lubricant from going back down into the reservoir 8 after lubrication. This reduces the volume of oil to be pumped with each lubrication operation. Since the lubricant is pushed by the air, a small quantity of air enters the enclosure after each lubrication, and the vacuum pump will have to remove this air, with the resulting energy consumption.

The system from the invention can operate with a control system referred to as "closed loop" with which to assure an optimal and effective lubrication with each cycle.

The first solution for doing this consists of using a level sensor in the reservoir 8. Nonetheless, this sensor is difficult to change in case of failure.

According to a preferred alternative, a flow rate sensor 13 is arranged on the pipe 14 for lifting the lubricant. A simple sensor of the type indicating whether the flow rate is greater than a given value ("on-off" sensor) is sufficient. The GEMS Sensors company produces a wide variety, like for example the FS-380 series. A pulse flow-rate sensor can also be used, for example the FT-110 series (from GEMS Sensors): each pulse indicates a certain volume of oil has passed, so that the lubrication can be stopped more precisely than a time delay.

The lubricant recovered in container 7 needs to be cleaned, to avoid premature wear of the bearings/rollers 3A and 3B. For this reason, a filter 17 is provided, advantageously arranged on the lifting pipe 14. The filter 17 is thus on the high part of the fly wheel and therefore accessible for maintenance; it also protects the sensor 13 from impurities.

Figure 3:
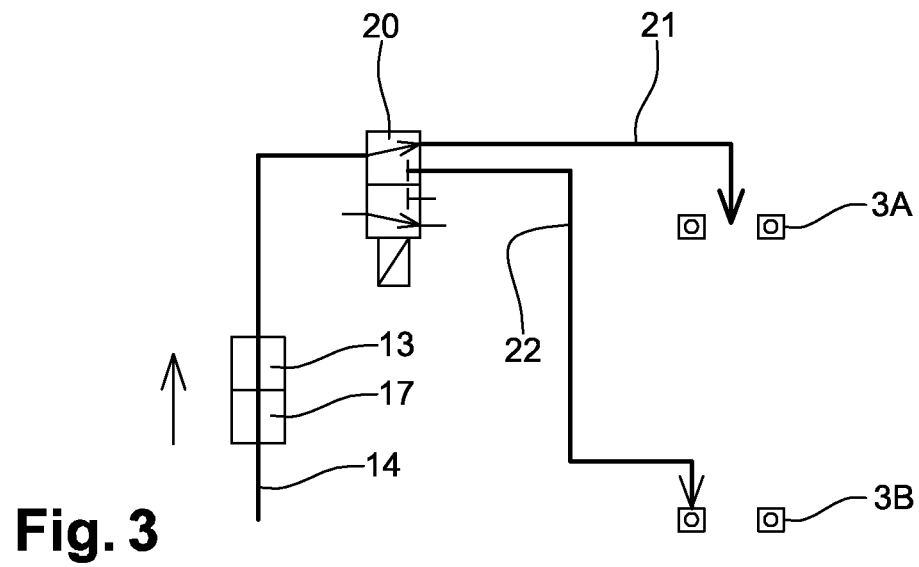
FIG. 3 is a variant drawing, for a flywheel provided with two rollers, respectively upper and lower, the circuit serving to lubricate both rollers separately.

According to the variant shown in FIG. 3, the rollers can be lubricated individually, because they can have different needs, with the system from the invention.

For this purpose, a second three-way valve 20 is provided arranged downstream from the filter 17 and from the sensor 13 with two outlet pipes 21, 22 connected to each roller 3A, 3B, for supplying them.

The lubrication time can vary from one roller to the other, in order to adapt the quantity of lubricant to the respective needs thereof. The sensor 13 serves to verify that each roller is well lubricated, so that the flywheel can be safely stopped if the lubricant is not provided (e.g. loss of lubricant, clogged filter, etc.).

Figure 4:
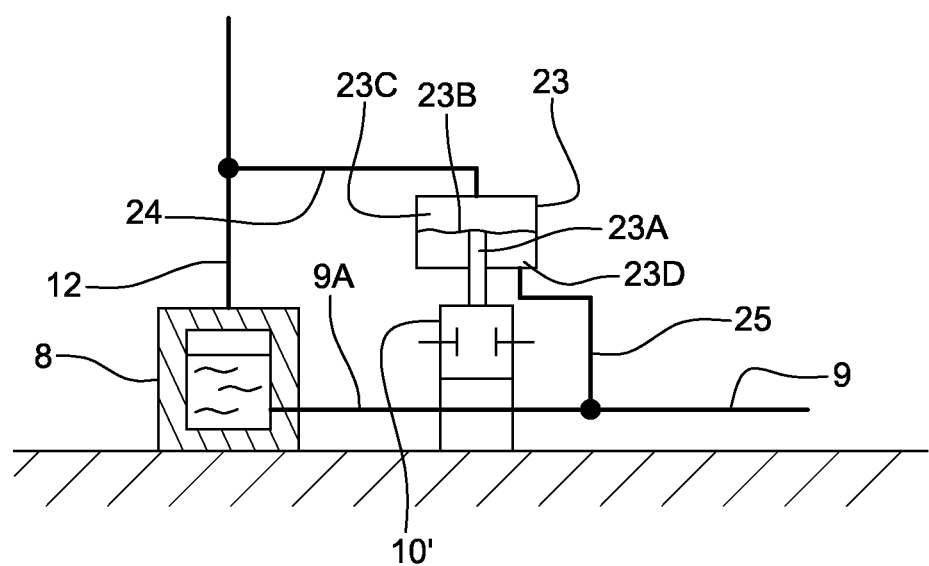
FIG. 4 is a variant for the control of the communication between the receptacle and the reservoir.

FIG. 4 shows an improved variant.

The valve 10 (from FIG. 1), which has to remain in the lower part of the installation, can prove difficult to repair case of trouble (e.g. failure of the coil, cable breakage, etc.).

The variant proposed in FIG. 4 calls on a pneumatically controlled valve 10' (instead of an electrically controlled system for the valve 10 for the system from FIG. 1). The electromagnet (for valve 10 from FIG. 1) is replaced here by a hydraulic cylinder/chamber 23 comprising a mobile piston 23A rigidly connected with a flexible membrane 23B separating the chamber into two compartments 23C and 23D, respectively connected to reservoir 8 by a pipe 24 and to the lower pipe 9 (further connected to the receptacle 7) by a pipe 25.

In a normal situation, the pressure (in fact the vacuum) is the same in each compartment 23C and 23D, and the piston is at rest; the valve 10' is thus open to allow the lubricant to fill the reservoir 8.

To release the lubricant, the reservoir 8 is connected to atmospheric pressure (valve 11—FIG. 1), which creates a pressure difference between the compartments 23C and 23D, causing the movement of the piston 23A, thus closing the valve 10'.

Figure 5:
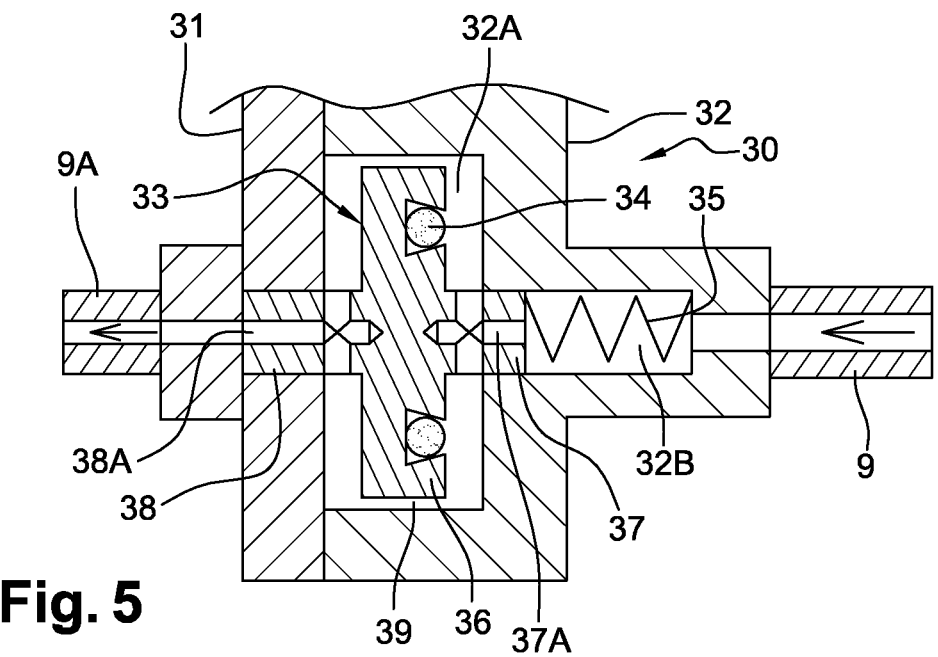
FIG. 5 is a partial section sketch of the anti-backflow valve, between the reservoir and the receptacle, in the open state.

In FIG. 5, which shows another improved variant, the section of the normally-open, anti-backflow valve 30, called on to replace the valve 10 (from FIG. 1) or 10' (for FIG. 4), is shown in detail.

The valve 30 comprises:
a body divided into a left part 31 and a right part 32, this latter defining a first interior housing (called diametrical) 32A and a second interior housing (called axial) 32B;
a mobile element 33 in the housing 32A, comprising a disc 36 and provided with an axial hub 37, 38 extending from each surface of the disc, where the surface of the disc 36 turned towards the axial housing 32B is provided with an annular throat in which an O-ring 34 is seated;
a spring 35 in the second housing 32B with one end butting against the rear part 37 of the hub.

The front 38 and rear 37 parts of the hub comprise through holes 37A and 38A connecting respectively:
the first housing 32A with the second axial housing 32B (which connects with the pipe 9);
the first housing 32A with the pipe 9A.

The lubricant can thus pass from the pipe 9 to the pipe 9A through the valve 30.

The disc 36 has an outside diameter slightly less in the inside diameter of the diametrical housing 32A. This clears a narrow passage 39 for the lubricant. The mobile element 33 can move in translation between the two parts 31, 32 because of the front and rear parts 37 and 38 of the hub, which respectively go in the axial housing 32B and an axial recess provided in the front part 31. The parts 37 and 38 of the hub guide the mobile element 33 in translation.

In the normal situation, the spring 35 pushes the mobile element 33 towards the part 31 which separates the O-ring 34 from the rear surface of the housing 32A. The lubricant then passes freely through the valve 30, by passing successively through the pipe 9, the axial housing 32B, the transverse hole 37A, the diametrical housing 32A, the narrow passage 39, again the diametrical housing 32A, and the hole 38A out to the pipe 9A.

When the reservoir 8 is brought to atmospheric pressure (by commanding the valve 11—FIG. 1), the lubricant from the reservoir 8 starts to flow in the reverse direction towards the receptacle 7 from the enclosure 2. The narrow passage 39 then creates a loss of head, producing a pressure difference between the surfaces the disc 36. The spring 35 has a calculated stiffness so that this pressure difference is sufficient to move the part 33 (and the disc 36) until the O-ring 34 bears against the rear surface of the diametrical housing 32A and in that way stops the flow.

The return of lubricant from the reservoir 8 to the receptacle 7 during lubrication is prevented that way without the need for a control system member such as an electromagnet.

Figure 6:
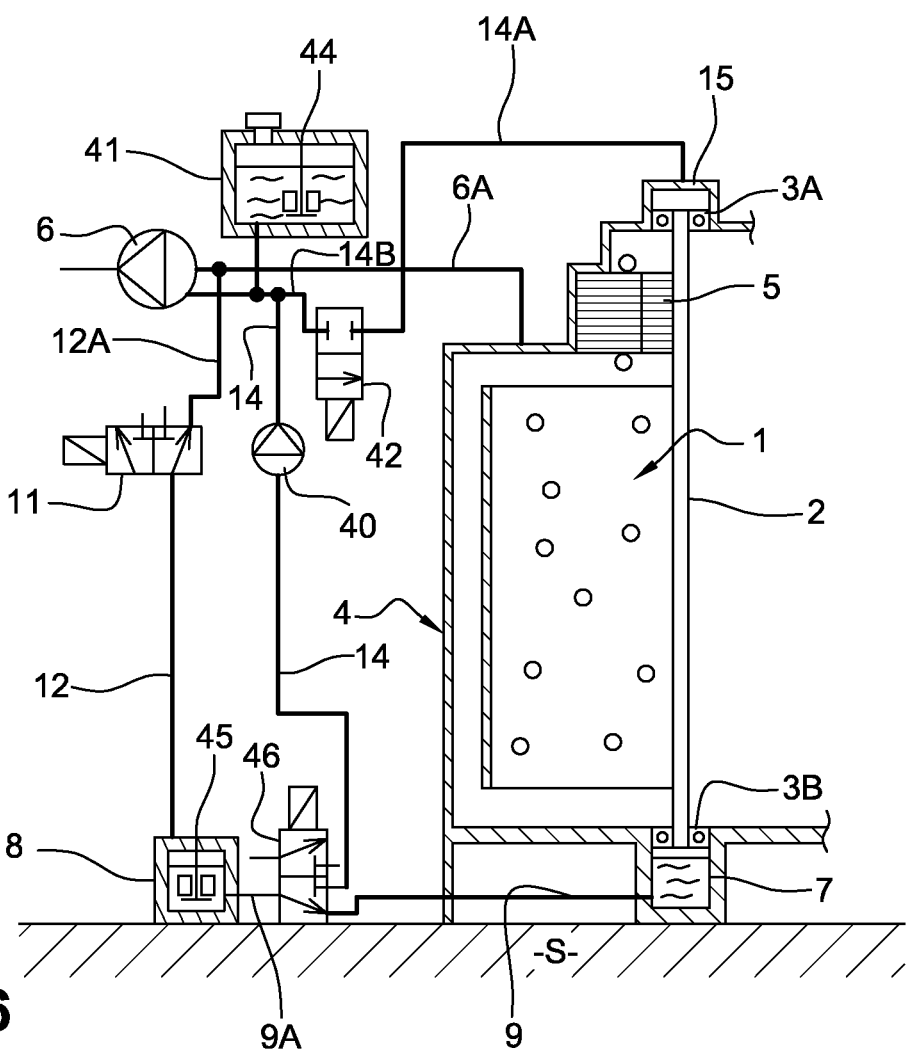
FIG. 6 shows a variant of FIG. 1 provided with a second reserve located on top.

FIG. 6 shows a variant called "dry housing" where the lubricant reserve is not in the receptacle 7 of the enclosure 4 but in an oil reservoir 41 arranged in the upper part of the flywheel.

The solenoid valve 11 is identical to that for FIG. 1 and connects the top of the reservoir 8 to the vacuum in the normal situation. The two-way solenoid 10 (from FIG. 1) is here replaced by a three-way solenoid valve 46 which connects the bottom of the reservoir 8 to the receptacle 7 of the enclosure 2 in the normal situation. The reservoir 8 comprises a level sensor 45 with which to monitor whether the oil level exceeds a certain value. When that happens, the oil in reservoir 8 is pumped to reservoir 41.

To do that, the solenoid valves 11 and 46, and also the pump 40, are commanded. The reservoir 8 is then brought to atmospheric pressure and the bottom of the reservoir 8 is connected to the pump 40 by the pipe 14. The pump 40 lifts the lubricant from the reservoir 8 to the reservoir 41 through the pipe 14B. The pumping is stopped when the level sensor 45 indicates that the reservoir 8 is empty.

To lubricate the rollers 3A and 3B of the flywheel 1, the solenoid valve 42, normally closed type, placed between the reservoir 41 and the upper supply point 15 of the enclosure, is opened.

Atmospheric pressure then pushes the lubricant from the reservoir 41 to the enclosure 2 under vacuum, by the pipes 14A and 14B.

A level sensor 44 in the reservoir 41 can detect a lack of lubricant.

The vacuum pump 6 can be lubricated directly by the lubricant from the reservoir 41 via the pipe 14B, which simplifies the maintenance thereof.

The advantage of this variant (FIG. 6) is to reduce the height of the lubrication system, because the lubricant is stored in the top part. The roller 3B can then be placed very close to the ground, within a few centimeters. The flywheel can then be placed in a space with limited height: building, container.

The concrete making up the flywheel is preferably a high-performance fiber-reinforced concrete with compressive strength over 80 MPa. The greater the strength thereof, the greater the capacity thereof to store energy.

The body of the flywheel is advantageously covered with fiber.

The lubricant can be oil, of vacuum pump oil type.

The invention claimed is:

1. A device for lubrication of a rotor turning under vacuum, the rotor including a shaft rotating relative to a fixed bearing structure, via at least one roller bearing the rotor being disposed in an evacuated enclosure connected to a vacuum pump, the device comprising:
 a lubricant reservoir configured to hold lubricant, the lubricant reservoir being connected by pipes both to a bottom of the evacuated enclosure and the at least one roller bearing; and
 a three-way valve configured to selectively couple the lubricant reservoir to: (i) the evacuated enclosure thereby causing the lubricant reservoir to be filled from the evacuated enclosure by gravity, and (ii) the atmosphere to push the lubricant toward the at least one roller bearing, thereby lubricating the at least one roller bearing.

2. The device for lubrication according to claim 1, further comprising a two-way, normally-open valve disposed between the lubricant reservoir and the evacuated enclosure.

3. The device for lubrication according to claim 2, wherein said two-way valve is controlled by a piston cylinder, one chamber of the piston cylinder being connected to the reservoir, the other chamber of the piston cylinder being connected to the evacuated enclosure, the piston of the piston cylinder controlling said two-way valve.

4. The device for lubrication according to claim 1, further comprising:
 a flow rate sensor disposed between the reservoir and the roller bearing; and
 a filter upstream from the sensor.

5. The device for lubrication according to claim 1, wherein the reservoir is disposed at the same level as, or lower than, a lower part of the evacuated enclosure.

6. The device for lubrication according to claim 1, further comprising a normally-open, anti-backflow valve between the reservoir and the evacuated enclosure.

7. The device for lubrication according to claim 1, further comprising an auxiliary three-way solenoid valve having two outlets each connected to the roller bearing.

8. A flywheel comprising:
 a massive body of a main material, the massive body being disposed on or combined with a shaft turning relative to a fixed bearing structure, by at least one roller bearing; and
 the lubrication device according to claim 1,
 wherein said flywheel is configured to be disposed in an enclosure, configured to receive the flywheel and the roller bearing, the enclosure being connected to the vacuum pump.

9. The flywheel of claim 8, wherein the main material is concrete.

10. The device of claim 1, wherein the rotor turning under vacuum is a flywheel.

11. The device for lubrication according to claim 10, further comprising:
 a flow rate sensor disposed between the reservoir and the at least one roller bearing, and
 a filter upstream from the flow rate sensor.

12. The device for lubrication according to claim 10, wherein the reservoir is disposed at the same level as, or lower than, a lower part of the evacuated enclosure.

13. A method for lubricating a flywheel including a body of a material and a lubrication device, the flywheel being rotatable about itself on a fixed vertical shaft axle bearing on at least one roller bearing, the method comprising:
 disposing the flywheel in a sealed enclosure;
 providing a vacuum pump and connecting the vacuum pump to the sealed enclosure;
 providing a lubricant reservoir configured to hold lubricant, the lubricant reservoir being provided at a bottom of the sealed enclosure;
 connecting the lubricant reservoir at the bottom of the sealed enclosure and the at least one roller bearing to each other by pipes; and
 selectively connecting, by a three-way valve, the reservoir to: (i) the sealed enclosure thereby causing the reservoir to be filled from the evacuated enclosure by gravity, and (ii) the atmosphere to push the lubricant toward the at least one roller bearing.

14. The method of claim 13, wherein the material of the body is concrete.

* * * * *